United States Patent
Ikeshima

(10) Patent No.: US 10,650,845 B2
(45) Date of Patent: May 12, 2020

(54) MAGNETIC DISK DEVICE CONFIGURED TO SPECIFY A RANGE OF PREVIOUSLY WRITTEN TRACK THAT IS TO BE OVERLAPPED DURING A WRITE AND VERIFY DATA PREVIOUSLY WRITTEN IN THE SPECIFIED RANGE AFTER THE WRITE

(71) Applicants: TOSHIBA ELECTRONIC DEVICES & STORAGE CORPORATION, Tokyo (JP); KABUSHIKI KAISHA TOSHIBA, Tokyo (JP)

(72) Inventor: Hitomi Ikeshima, Ota Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 16/286,519

(22) Filed: Feb. 26, 2019

(65) Prior Publication Data
US 2020/0090684 A1 Mar. 19, 2020

(30) Foreign Application Priority Data
Sep. 18, 2018 (JP) .................................. 2018-174161

(51) Int. Cl.
| | | |
|---|---|---|
| *G11B 5/012* | (2006.01) | |
| *G11B 5/09* | (2006.01) | |
| G11B 27/36 | (2006.01) | |
| G11B 5/027 | (2006.01) | |
| G11B 15/20 | (2006.01) | |
| G11B 5/54 | (2006.01) | |
| G11B 20/18 | (2006.01) | |

(52) U.S. Cl.
CPC ................ *G11B 5/09* (2013.01); *G11B 5/012* (2013.01); *G11B 5/0275* (2013.01); *G11B 5/54* (2013.01); *G11B 15/20* (2013.01); *G11B 20/18* (2013.01); *G11B 27/36* (2013.01)

(58) Field of Classification Search
None
See application file for complete search history.

(56) References Cited

U.S. PATENT DOCUMENTS

| | | | |
|---|---|---|---|
| 8,665,545 B2 | 3/2014 | Coker et al. | |
| 8,817,413 B1* | 8/2014 | Knigge | G11B 5/6005 360/75 |
| 8,941,943 B1* | 1/2015 | Coker | G11B 5/012 360/48 |
| 9,047,923 B1 | 6/2015 | Lum et al. | |

(Continued)

*Primary Examiner* — Tan X Dinh
(74) *Attorney, Agent, or Firm* — Kim & Stewart LLP

(57) ABSTRACT

A magnetic disk device includes a magnetic disk and a control circuit. The magnetic disk includes a first area where writing is performed in a manner such that a newly written track partially overlaps a previously written adjacent track. The control circuit is configured to specify a range of a second track, which is to be overlapped as a result of writing first data to a first track, write second data written in the specified range of the second track to a saving area prior to writing the first data to the first track, write the first data to the first track, and verify the second data in the second track after writing the first data to the first track.

20 Claims, 7 Drawing Sheets

(56) References Cited

U.S. PATENT DOCUMENTS

| | | | | |
|---|---|---|---|---|
| 9,269,376 B1* | 2/2016 | Hess | .................... | G11B 5/012 |
| 9,852,746 B2 | 12/2017 | Nakashita et al. | | |
| 2013/0148225 A1* | 6/2013 | Coker | .................. | G11B 19/045 |
| | | | | 360/31 |
| 2015/0160882 A1* | 6/2015 | Coker | .................. | G06F 3/0626 |
| | | | | 711/111 |
| 2015/0318022 A1* | 11/2015 | Sutardja | ................ | G06F 3/0611 |
| | | | | 360/31 |
| 2015/0378621 A1* | 12/2015 | Bruner | ................. | G06F 3/0619 |
| | | | | 711/114 |
| 2016/0148644 A1* | 5/2016 | Zhu | .................... | G11B 20/1217 |
| | | | | 360/48 |
| 2017/0011769 A1* | 1/2017 | Shang | ................ | G11B 20/1816 |
| 2019/0286342 A1* | 9/2019 | Tang | .................... | G06F 3/0676 |

\* cited by examiner

MAGNETIC DISK DEVICE CONFIGURED TO SPECIFY A RANGE OF PREVIOUSLY WRITTEN TRACK THAT IS TO BE OVERLAPPED DURING A WRITE AND VERIFY DATA PREVIOUSLY WRITTEN IN THE SPECIFIED RANGE AFTER THE WRITE

CROSS-REFERENCE TO RELATED APPLICATIONS

This application is based upon and claims the benefit of priority from Japanese Patent Application No. 2018-174161, filed Sep. 18, 2018, the entire contents of which are incorporated herein by reference.

FIELD

Embodiments described herein relate generally to a magnetic disk device and a control method of the magnetic disk device.

BACKGROUND

A magnetic disk device may have a function of a write-and-verify processing that includes writing data to a magnetic disk and then verifying that the written data can be read correctly.

DETAILED DESCRIPTION

In order to execute a write-and-verify processing, a saving area where data that has not been completely subjected to the write-and-verify processing, is stored may be necessary.

Embodiments provide a magnetic disk device which reduces the amount of data stored in a saving area.

In general, according to one embodiment, a magnetic disk device includes a magnetic disk and a control circuit. The magnetic disk includes a first area where writing is performed in a manner such that a newly written track partially overlaps a previously written adjacent track. The control circuit is configured to specify a range of a second track, which is to be overlapped as a result of writing first data to a first track, write second data written in the specified range of the second track to a saving area prior to writing the first data to the first track, write the first data to the first track, and verify the second data in the second track after writing the first data to the first track.

Hereinafter, a magnetic disk device and a control method of the magnetic disk device according to an embodiment will be described in detail with reference to the accompanying drawings. In addition, the scope of this disclosure is not limited by the present embodiment.

Embodiment

Figure 1:
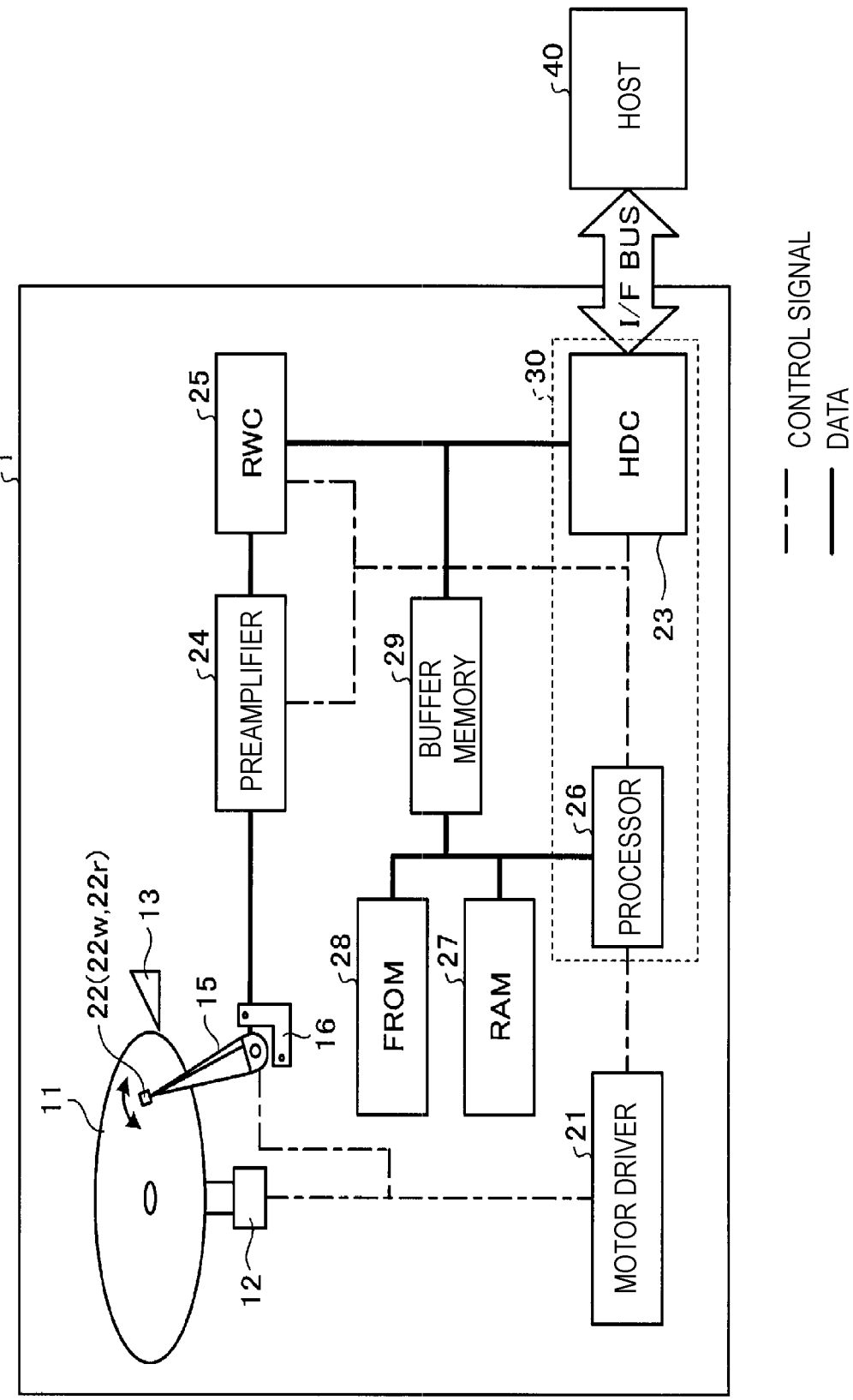
FIG. 1 is a diagram illustrating an example of a configuration of a magnetic disk device according to an embodiment.

FIG. 1 is a diagram illustrating an example of a configuration of a magnetic disk device 1 according to an embodiment.

The magnetic disk device 1 is connected to a host 40. The magnetic disk device 1 may receive an access request from the host 40. For example, a write request for writing data or a read request for reading data corresponds to the access request mentioned here.

The magnetic disk device 1 includes a disk medium 11 which is a magnetic disk. The magnetic disk device 1 writes data to the disk medium 11 or reads data from the disk medium 11 in response to the access request.

The magnetic disk device 1 writes data to the disk medium 11 via a magnetic head 22, and reads data from the disk medium 11 via the magnetic head 22. More specifically, the magnetic disk device 1 includes the disk medium 11, a spindle motor 12, a motor driver 21, the magnetic head 22, an actuator arm 15, a voice coil motor (VCM) 16, a ramp 13, a preamplifier 24, a read/write channel (RWC) 25, a hard disk controller (HDC) 23, a buffer memory 29, and a processor 26.

The disk medium 11 is rotated at a predetermined rotational speed around the rotation axis thereof by the spindle motor 12. The spindle motor 12 is driven to rotate by the motor driver 21.

The magnetic head 22 writes and reads data to and from the disk medium 11 using a write element $22w$ and a read element $22r$ provided therein. In addition, the magnetic head 22 is provided on the tip of the actuator arm 15 and is moved along the radial direction of the disk medium 11 by the VCM 16 which is driven by the motor driver 21. When the rotation of the disk medium 11 stops, the magnetic head 22 is moved onto the ramp 13.

The preamplifier 24 amplifies and outputs a signal read from the disk medium 11 by the magnetic head 22, and supplies the signal to the RWC 25 during a read operation. In addition, the preamplifier 24 amplifies a signal supplied from the RWC 25 for writing data to the disk medium 11, and supplies the amplified signal to the magnetic head 22.

The HDC 23 performs, for example, control of data transmission and reception to and from the host 40 via an I/F bus, control of the buffer memory 29, and an error correction processing for read data.

The buffer memory 29 is used as a buffer for data which is transmitted to and received from the host 40. The buffer memory 29 is particularly used for temporarily storing data written to the disk medium 11.

The buffer memory 29 is, for example, a volatile memory capable of operating at a high speed. The buffer memory 29 is not limited to a specific type. The buffer memory 29 may be, for example, a dynamic random access memory (DRAM) or a static random access memory (SRAM).

The RWC 25 code-modulates data which is supplied from the HDC 23 and is to be written to the disk medium 11, and supplies the data to the preamplifier 24. In addition, the RWC 25 code-demodulates a signal which is read from the disk medium 11 and is supplied from the preamplifier 24, and outputs the signal as digital data to the HDC 23.

The processor 26 is, for example, a central processing unit (CPU). The processor 26 is connected to a RAM 27, to a flash read only memory (FROM) 28, and to the buffer memory 29.

The RAM 27 is, for example, a DRAM or an SRAM. The RAM 27 is used as a memory for an operation by the processor 26. The RAM 27 is used as an area where firmware (e.g., program data) is loaded into or an area where various types of management data are stored.

The FROM 28 is an example of a nonvolatile memory. The processor 26 performs the overall control of the magnetic disk device 1 according to firmware which is stored in advance in the FROM 28 and the disk medium 11. For example, the processor 26 loads the firmware which is stored in advance in the FROM 28 and the disk medium 11 into the RAM 27, and executes control of the motor driver 21, the preamplifier 24, the RWC 25, and the HDC 23, for example, according to the loaded firmware.

In addition, a configuration including the processor 26 and the HDC 23 may also be regarded as a control circuit 30. The control circuit 30 may include other elements such as, for example, the RAM 27, the FROM 28, the buffer memory 29, and the RWC 25.

Figure 2:
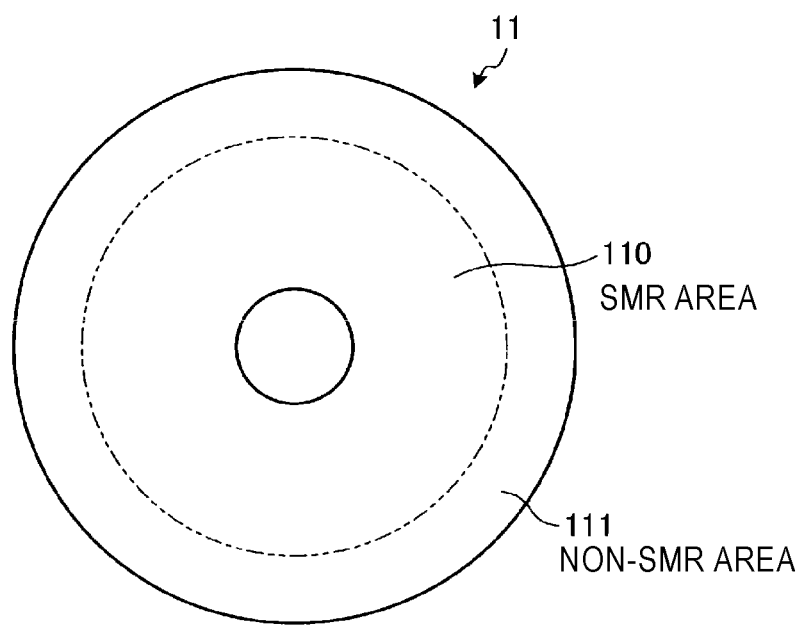
FIG. 2 is a diagram for explaining a recording area of a disk medium according to the embodiment.

FIG. 2 is a diagram for explaining a recording area of the disk medium 11 according to the embodiment. The disk medium 11 includes an SMR area 110 in which data is written by a method called "shingled magnetic recording (SMR)" and a non-SMR area 111 in which data is written by a method different from SMR.

The SMR area 110 has a capacity corresponding to a user capacity. The non-SMR area 111 is reserved in the disk medium 11 in addition to the user capacity.

According to an example of FIG. 2, the SMR area 110 is allocated to the inner side of the disk medium 11 and the non-SMR area 111 is allocated to the outer side of the disk medium 11. Alternatively, the SMR area 110 may be allocated to the outer side of the disk medium 11 and the non-SMR area 111 may be allocated to the inner side of the disk medium 11.

Figure 3:
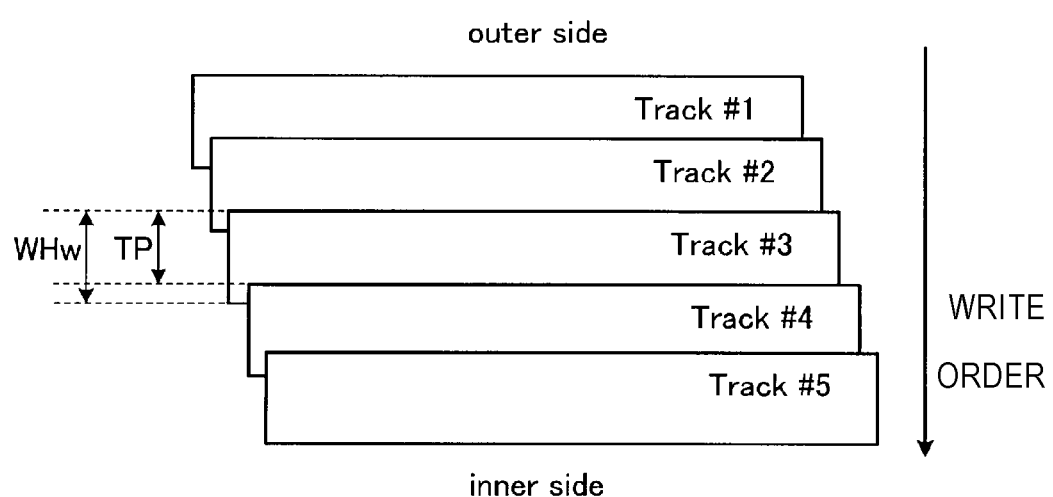
FIG. 3 is a schematic diagram for explaining an SMR method according to the embodiment.

FIG. 3 is a schematic diagram for explaining an SMR method of the embodiment. "SMR" is a recording method of writing data by the write element 22w so that each track overlaps with a portion of an adjacent track.

For example, a portion of a track #2 overlaps with a track #1. In addition, a portion of a track #3 overlaps with a track #2. That is, according to SMR, a processing in which one track overlaps with a portion of an adjacent track to which data is already written is repeated.

Therefore, a track pitch TP of each track becomes narrower than a core width WHw of the write element 22w of the magnetic head 22. As a result, a recording density may be increased.

In addition, FIG. 3 illustrates the state of each track when writing is performed from the outer side to the inner side of the disk medium 11. The direction of writing is not limited thereto. Writing may be performed from the inner side to the outer side of the disk medium 11.

Figure 4:
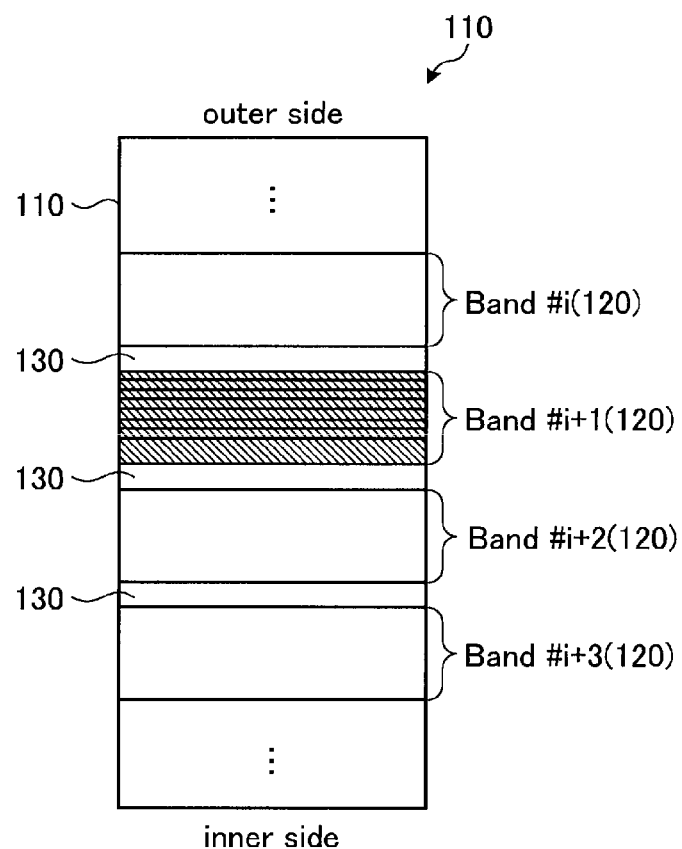
FIG. 4 is a diagram illustrating an example of a configuration of an SMR area according to the embodiment.

FIG. 4 is a diagram illustrating an example of a configuration of the SMR area 110 according to the embodiment. The SMR area 110 includes a plurality of bands 120 arranged in the radial direction. The respective bands 120 have a concentric circular shape. A guard area 130 is allocated between the bands 120. The guard area 130 is an area where no data is written.

Each band 120 has a width in which data of a plurality of tracks may be written. In each band 120, data for a plurality of tracks is written according to the SMR method. In the example of FIG. 4, data is written throughout band # i+1 and no data is written to band # i, band # i+2, and band # i+3.

In addition, for example, the band 120 is defined as the minimum unit area where data with consecutive logical addresses is written in order of the logical addresses. The logical address is positional information indicating a position within a logical address space which is provided to the host 40 by the magnetic disk device 1.

Figure 5:
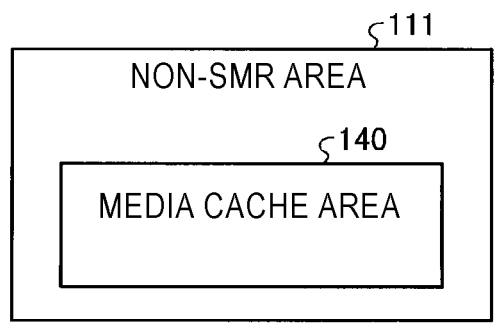
FIG. 5 is a diagram illustrating an example of a configuration of a non-SMR area according to the embodiment.

FIG. 5 is a diagram illustrating an example of a configuration of the non-SMR area 111 according to the embodiment. In the non-SMR area 111, data is written by a method called "Conventional Magnetic Recording (CMR)", for example. "CMR" is a recording method of performing writing so that respective tracks do not overlap. That is, according to CMR, each track has a width corresponding to the core width WHw of the write element.

As illustrated in FIG. 5, in the non-SMR area 111, a media cache area 140 which is a redundant area is provided. The media cache area 140 is used for various purposes.

For example, a range of logical addresses is assigned to each band 120. That is, data in the assigned range of logical addresses is written to each band 120. Then, when data in the range of logical addresses assigned to a certain band 120 does not fit in the band 120, overflow data may be written in the media cache area 140.

In the embodiment, the media cache area 140 may be used as a saving area during a write-and-verify processing. The write-and-verify processing is a processing that includes writing data to a magnetic disk and then confirming (or verifying) that the written data can be read correctly.

In the verification, for example, data is read, and error detection for the read data is performed. Then, based on the result of error detection, it is determined whether or not the data can be read correctly.

For example, the error detection may be performed in the HDC 23 or may be performed in the processor 26. In addition, a criterion for determining whether or not data can be read correctly may be set in any manner.

In one example, whether or not data can be read correctly may be determined based on comparison between the number of detected errors and a predetermined threshold (e.g., zero). For example, when the number of detected errors is equal to or less than the predetermined threshold, it is determined that data can be read correctly. When the number of detected errors exceeds the predetermined threshold, it is determined that data cannot be read correctly.

In another example, when an error is detected, error correction is performed, and whether or not data can be read correctly may be determined based on whether or not error correction succeeded. When the error correction succeeded, it is determined that the data can be read correctly. When the error correction failed, it is determined that the data cannot be read correctly.

In another example of verification, a copy of data is generated before the data is written. Then, the data is written and then read. Then, the read data is compared with the copy of data, and when they match, it is determined that the data can be read correctly. When they do not match, it is determined that the data cannot be read correctly.

Figure 6A:
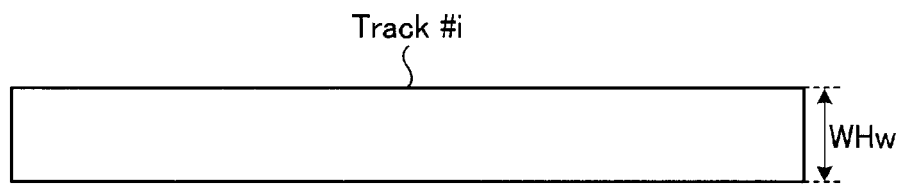
FIGS. 6A and 6B are schematic diagrams for explaining the timing of verification in a write-and-verify processing according to the embodiment.
Figure 6B:
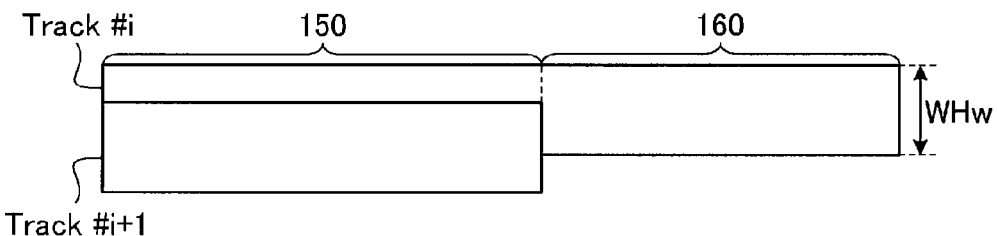

Next, the timing of verification in the write-and-verify processing will be described. FIGS. 6A and 6B are schematic and illustrative diagrams for explaining the timing of verification in the write-and-verify processing according to the embodiment.

For example, as illustrated in FIG. 6A, data is written to a certain track # i. At this time, the width of the track # i corresponds to the core width WHw of the write element 22w. That is, the track # i has the same width as the width when data is written by the CMR method.

The width of the track # i is reduced by overwriting data of a track # i+1. Thus, even if verification of the data in the track # i is executed before the data of the track # i+1 is overwritten and the verification succeeded, there is a possibility that the data cannot be read correctly from the track # i since the width of the track # i is reduced by overwriting the data of the track # i+1.

That is, even if verification of data is executed immediately after the data is written to the track # i and the verification succeeded, it is not guaranteed that the data in the track # i can be read correctly.

Therefore, verification of data written to each track is executed after data of a next track is written.

For example, as illustrated in FIG. 6B, a case where data of the track # i+1 is written after data of the track # i is written is conceivable. In this case, the width of the track # i in a range 150 is reduced. On the other hand, the width of a range 160 of the track # i is not yet reduced since the data of the track # i+1 is not yet written to overlap the range 160.

In the example of FIG. 6B, verification is performed for the data within the range 150 of the track # i. For the data within the range 160 of the track # i, verification is delayed until the width is reduced by writing the data of the track # i+1.

That is, verification is executed for a range in a state where the width of a track is reduced by overwriting. Therefore, it is possible to verify whether or not data can be read correctly at the time of actual reading by the write-and-verify processing. When the verification succeeded in the write-and-verify processing, it is guaranteed that the data can be read correctly at the time of actual reading.

In addition, not only verification for a range of the track in a state where the width thereof is reduced as described above but also verification for a range of the track in a state where the width thereof is not yet reduced may be executed. In this specification, the verification for the range in the state where the width thereof is reduced is referred to as SMR verification. The verification for the range in the state where the width of the track is not yet reduced is referred to as CMR verification.

For example, when data is written to the track # i as illustrated in FIG. 6A, CMR verification is executed for the data in the track # i. Subsequently, when data is written to the track # i+1 as illustrated in FIG. 6B, CMR verification is executed for the data in the track # i+1, and SMR verification is executed for the data within the range 150 of the track # i.

The CMR verification may be executed in the same manner as the SMR verification. That is, in the CMR verification, whether or not data can be read correctly may be determined based on the result of error detection or error correction, or may be determined based on comparison between data before writing and data after writing. Alternatively, in the CMR verification, whether or not data can be read correctly may be determined by a method different from these methods.

In addition, for the last track among the plurality of tracks written to each band 120, the execution of the SMR verification is omitted. This is because overwriting of data of a next track is not executed for the data in the last track.

Hereinafter, a range in which the width of a track is reduced by next writing among a range in which data is already written, like the range 150, is referred to as an overlapped range.

Through the processing described above, the data in the band 120 is in a state where it is not yet verified that the data can be read correctly until data of a next track is overwritten. When the SMR verification for the data in the state where it is not yet verified that the data can be read correctly fails, the data in the band 120 is invalidated. Even in such a case, there is a demand for a method of preventing the data from being lost from the magnetic disk device 1.

Therefore, in the embodiment, before writing data (referred to herein as first data) to a track (referred to herein as first track), the control circuit 30 specifies a range in which a track pitch is reduced by writing to the first track, i.e., an overlapped range of a track which is adjacent to the first track (referred to herein as second track) and to which data is already written, and copies the data written in the specified range (referred to herein as second data) to a saving area. After executing the copying, the control circuit 30 executes writing of the first data to the first track. After writing the first data, the control circuit 30 executes the SMR verification for the second data in the second track.

Thus, even if the SMR verification failed, it is possible to execute writing to the disk medium 11 later using the second data in the saving area. That is, the loss of the second data from the magnetic disk device 1 is prevented.

A method of storing a copy of data in a saving area for a period of time until the SMR verification is completed after the data is written to the band 120 is conceivable. This method is referred to as a comparative example.

According to the comparative example, since it is necessary to store, in the saving area, all data that is not completely subjected to the SMR verification among the data written to the band 120, a large saving area is required.

According to the present embodiment, a copy of data is not stored in the saving area until writing in an overlapping track is performed. Therefore, it is possible to reduce the amount of data stored in the saving area as compared with the comparative example.

In addition, according to the present embodiment, the amount of data stored in the saving area is set to data in the overlapped range among data for which the write-and-verify processing is not completed. Therefore, it is possible to reduce the amount of data stored in the saving area as compared with the comparative example.

According to the present embodiment, since the amount of data stored in the saving area is reduced, it is possible to reduce the capacity of the saving area. By reducing the capacity of the saving area, various advantages may be obtained.

For example, when the media cache area 140 is used as a saving area, according to the comparative example, since the capacity of the media cache area 140 used as the saving area is large, the frequency of executing a processing for organizing data in the media cache area 140 (e.g., a flush processing or a garbage collection processing) is increased. Thus, there is a possibility that the performance of the magnetic disk device 1 is deteriorated.

On the other hand, according to the present embodiment, since a required capacity of the saving area is smaller than that of the comparative example, it is possible to prevent an increase in the frequency of executing a processing for organizing data in the media cache area 140. In other words, deterioration in the performance of the magnetic disk device 1 is prevented.

In addition, as a result of requiring a smaller saving area, an area used as the saving area is not limited only to the media cache area 140. In the present embodiment, as one example, the buffer memory 29 may also be used as the saving area.

Since the buffer memory 29 is a volatile memory, the buffer memory 29 may operate at a higher speed than the FROM 28 or the disk medium 11, for example. Thus, by setting the saving area in the buffer memory 29, the write-and-verify processing is realized at a high speed. However, when the supply of power to the buffer memory 29 is interrupted, content stored in the buffer memory 29 disappears.

A power loss protection (PLP) function is known as a function of protecting the content stored in the buffer memory 29 from being lost. The PLP function is a function of saving data which is stored in the buffer memory 29 and is being recorded on a disk to a nonvolatile storage area (e.g., the FROM 28) when the supply of power from an external power supply (not illustrated) to the magnetic disk device 1 is interrupted.

In the PLP function, the transfer of data from the buffer memory 29 to the nonvolatile storage area is executed, for example, by auxiliary power such as, for example, energy accumulated in a capacitor (not illustrated) mounted in the magnetic disk device 1 or energy generated when the rotation of the disk medium 11 stops. Since the amount of energy that may be used for the transfer of data is limited, the amount of data that may be transferred from the buffer memory 29 to the nonvolatile storage area is also limited.

The control circuit 30 sets a saving area having a size to be acquired in the buffer memory 29 when there is room in the size of data that is protectable by the PLP function, i.e., the amount of data that may be transferred by auxiliary power. That is, the control circuit 30 uses the buffer memory 29 as a saving area. The control circuit 30 does not use the buffer memory 29 as a saving area when the magnetic disk device 1 does not have the PLP function or when the size of data that is protectable by the PLP function does not allow for the saving area.

In the embodiment, in addition to the buffer memory 29, the FROM 28 may be used as a saving area. When there is an available area in the FROM 28, the control circuit 30 may set the available area to a saving area.

Figure 7:
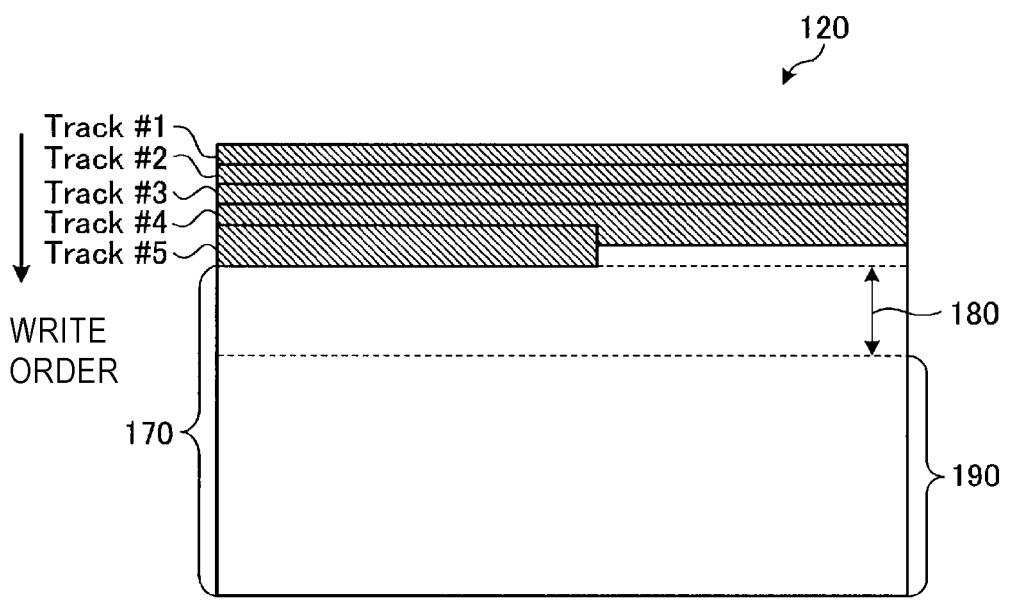
FIG. 7 is a diagram for explaining an area which may be used as a saving area in a band according to the embodiment.

In addition, in the embodiment, when there is an unused area in the band 120, the unused area may be used as a saving area. FIG. 7 is a diagram for explaining an area which may be used as a saving area in the band 120 according to the embodiment.

In an example of FIG. 7, the band 120 in a state where data is written to the middle of a fifth track (track #5) is illustrated. In this case, an area 170 in this drawing corresponds to an area where data is not yet written, i.e., an unused area.

When writing is performed on a magnetic disk, the magnetic field generated by a write element may affect a track near a write position, which may degrade the signal quality of the track. This phenomenon is known as Adjacent Track Interference (ATI). When a saving area is set to a position close to the position at which writing is completed, there is a possibility that data that is already written is unreadable due to magnetic interference at the time of writing to the saving area. The level of magnetic interference increases with a decreasing distance to the write position.

Thus, in the present embodiment, a saving area is set to a position that is spaced apart from the last track on which writing has been executed (i.e., the track #5 in this drawing) by a predetermined distance (the distance 180 in FIG. 7) or longer considering the influence of ATI. That is, a saving area is set within a non-interference area 190 in which there is no magnetic interference to data on which writing is already executed or in which the influence of interference is not more than a predetermined level.

In addition, the position of a saving area when the available area in the band 120 is used as the saving area is not limited to the above description. Any position in the area 170 may be used as a saving area.

In this manner, any storage area may be used as a saving area.

Figure 8:
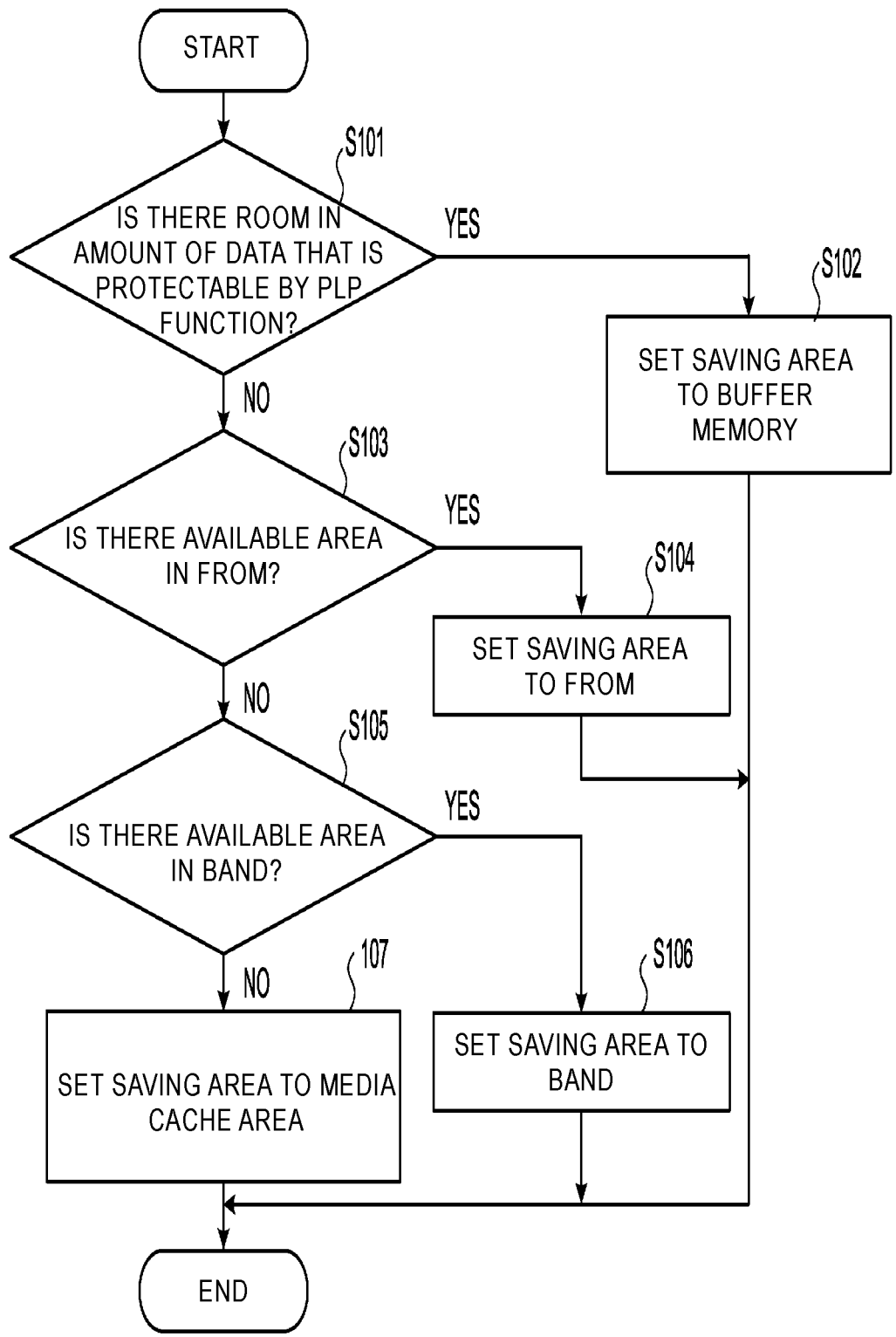
FIG. 8 is a flowchart illustrating an example of an operation of setting the saving area according to the embodiment.

Next, an operation of the magnetic disk device 1 according to the embodiment will be described. FIG. 8 is a flowchart illustrating an example of an operation of setting the saving area according to the embodiment. Each processing illustrated in this drawing is executed by the control circuit 30. Each processing illustrated in this drawing may be executed by any of the components (the processor 26 and the HDC 23) of the control circuit 30. All processing illustrated in this drawing may be executed by the processor 26. All processing illustrated in this drawing may be executed by the HDC 23. In addition, the timing of executing a series of processing illustrated in this drawing is not limited to a specific timing. The series of processing illustrated in this drawing may be executed before a processing of a write request starts or during the processing of the write request. The series of processing illustrated in this drawing may be executed only once after startup, or may be executed for every write request.

First, the control circuit 30 determines whether or not there is room in the amount of data that is protectable by the PLP function (S101).

As described above, the data received from the host 40 is buffered in the buffer memory 29, and thereafter the data in the buffer memory 29 is written to the disk medium 11. The data in the buffer memory 29 is protected by the PLP function. In S101, for example, when the amount obtained by subtracting the total amount of data buffered in the buffer memory 29 from the amount of data that may be transferred to the nonvolatile storage area by the PLP function exceeds a predetermined amount, the control circuit 30 determines that there is room in the amount of data that is protectable by the PLP function. When the amount obtained by subtracting the total amount of data buffered in the buffer memory 29 from the amount of data that may be transferred to the nonvolatile storage area by the PLP function is less than the predetermined amount, the control circuit 30 determines that there is no room in the amount of data that is protectable by the PLP function.

When the magnetic disk device 1 does not have the PLP function, the control circuit 30 determines in S101 that there is no room in the amount of data that is protectable by the PLP function.

When it is determined that there is room in the amount of data that is protectable by the PLP function (Yes in S101), the control circuit 30 sets a saving area to the buffer memory 29 (S102). That is, the control circuit 30 determines to use the buffer memory 29 as a saving area. Then, the operation of setting the saving area ends.

When it is determined that there is no room in the amount of data that is protectable by the PLP function (No in S101), the control circuit 30 determines whether or not there is an available area in the FROM 28 (S103).

For example, in S103, the control circuit 30 determines whether or not there is an available area having a predetermined size in the FROM 28. When it is determined that there is an available area having a predetermined size in the FROM 28, the control circuit 30 determines that there is an available area in the FROM 28. When it is determined that there is no available area having a predetermined size in the FROM 28, the control circuit 30 determines that there is no available area in the FROM 28.

When it is determined that there is an available area in the FROM 28 (Yes in S103), the control circuit 30 sets a saving area to the FROM 28 (S104). That is, the control circuit 30 determines to use the FROM 28 as a saving area. Then, the operation of setting the saving area ends.

When it is determined that there is no available area in the FROM 28 (No in S103), the control circuit 30 determines whether or not there is an available area in the band 120 (S105).

As described above, in the embodiment, as an example, a saving area may be set to the non-interference area 190 of the unused area 170 which is not influenced by ATI or in which the influence of ATI may be ignored. In S105, the size of the non-interference area 190 in which there is no magnetic interference to data on which writing is already executed or in which the influence of interference is not more than a predetermined level is confirmed. When the size of the non-interference area 190 is equal to or greater than a predetermined size, the control circuit 30 determines that there is an available area in the band 120. When the size of the non-interference area 190 is less than the predetermined size or when there is no non-interference area 190, the control circuit 30 determines that there is no available area in the band 120.

In addition, when a series of processing in this drawing is executed after receiving a write request, the control circuit 30 may determine in S105 whether or not there is an available area in a target band 120 of the write request. In this case, since a saving area may not be set to a position close to the write position, it is possible to copy data without unnecessarily increasing the seek time.

In addition, the control circuit 30 may search an available area not only from the target band 120 of the write request but also from other bands 120.

When it is determined that there is an available area in the band 120 (Yes in S105), the control circuit 30 sets a saving area within the band 120 (S106). That is, the control circuit 30 decides to use the non-interference area 190 in the band 120 as a saving area. Then, the operation of setting the saving area ends.

When it is determined that there is no available area in the band 120 (No in S105), the control circuit 30 sets a saving area to the media cache area 140. That is, the control circuit 30 determines to use the media cache area 140 as a saving area. Then, the operation of setting the saving area ends.

In addition, the operation of setting the saving area is not limited to the processing illustrated in FIG. 8. The storage area used as the saving area may be determined in advance by parameters, for example, and the control circuit 30 may set the saving area according to the parameters.

Figure 9:
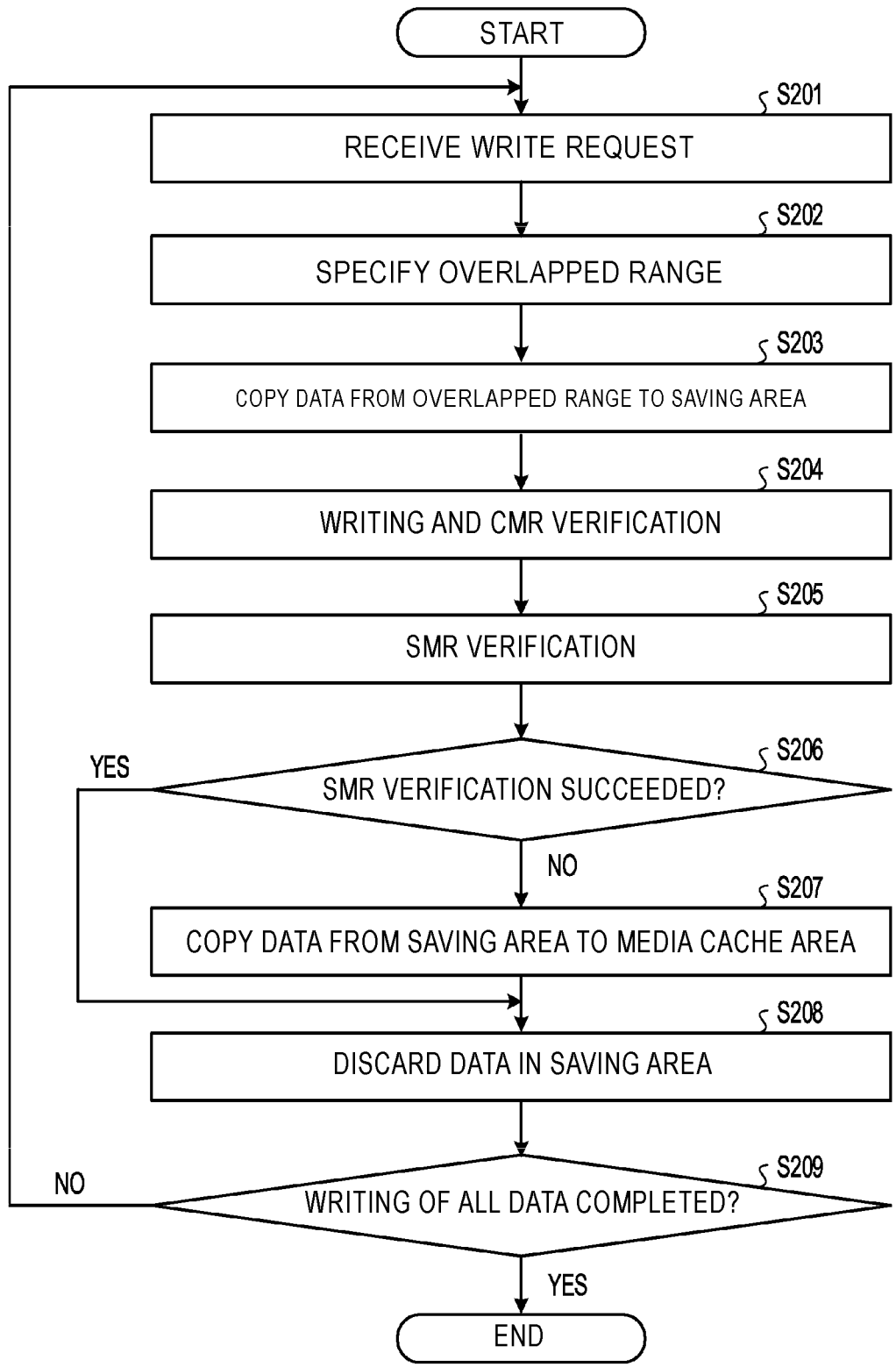
FIG. 9 is a flowchart illustrating an operation of the write-and-verify processing according to the embodiment.

FIG. 9 is a flowchart illustrating an operation of the write-and-verify processing according to the embodiment. Each processing illustrated in this drawing is executed by the control circuit 30. Each processing illustrated in this drawing may be executed by any of the components (the processor 26 and the HDC 23) of the control circuit 30. All processing illustrated in this drawing may be executed by the processor 26. All processing illustrated in this drawing may be executed by the HDC 23.

When receiving a write request (S201), the control circuit 30 specifies the overlapped range in the range in which data is already written (S202).

Explaining this in accordance with the example of FIGS. 6A and 6B, when writing of data to the track # i+1 is requested in S201 in a state where data is written to the track # i, the range 150 of the track # i is specified as the overlapped range.

Here, the size of the overlapped range specified in S202 is set to be equal to or less than the size of the saving area. That is, when the size of data that is requested to be written is greater than the size of the saving area, a range having the same size as the saving area among the range in which the data is already written is specified as the overlapped range. Thus, subsequent writes to the band 120 of a write destination and corresponding verifications, are executed for each size of the saving area.

Following S202, the control circuit 30 copies data from the overlapped range to the saving area (S203). Then, the control circuit 30 executes writing and CMR verification (S204).

In addition, in the description of this drawing, data within the overlapped range may be referred to as target data. In addition, a copy of the target data may be referred to as backup data. That is, in S203, backup data is generated in the saving area.

The data requested to be written is stored in the buffer memory 29. In S204, the control circuit 30 writes data having a size within the overlapped range among the data stored in the buffer memory 29 to a position adjacent to the overlapped range in the band 120 of the write destination. This reduces the width of the track in the overlapped range. Then, CMR verification is executed for the newly written data.

According to the example of FIGS. 6A and 6B, in S204, data is written to the track # i+1, and then CMR verification is executed for the data in the track # i+1.

Following S204, the control circuit 30 executes SMR verification for the data within the overlapped range, i.e., target data (S205).

According to the example of FIG. 6B, in S205, SMR verification is executed for the data of the range 150 of the track # i in which the width of the track is reduced.

In the SMR verification, reading of the target data may be executed, and whether or not the target data can be read correctly may be determined based on the result of error detection or the result of error correction at the time of the reading. Alternatively, whether or not the target data can be read correctly may be determined based on comparison between the read target data and the backup data in the saving area.

Following S205, the control circuit 30 determines whether or not the SMR verification succeeded (S206).

When the SMR verification failed (No in S206), that is, when the SMR verification may not verify that the target data can be read correctly, the control circuit 30 copies the backup data in the saving area to the media cache area 140 (S207).

In S207, the control circuit 30 invalidates the target data and validates the backup data written in the media cache area 140. That is, the control circuit 30 replaces the overlapped range with the media cache area 140.

Therefore, for example, when a read request is received and target data of the read request is included in the overlapped range, the control circuit 30 may read the backup data written in the media cache area 140 other than the target data.

In addition, the method of validation and invalidation is not limited to a specific method. In one example, the control circuit 30 manages a correspondence between a logical address and each position in the magnetic disk 11. Validation means that the logical address is associated with the position, and invalidation means that the logical address is not associated with the position. In S207, the control circuit 30 eliminates a correspondence between the overlapped range and the logical address, and associates the logical address with a write destination of the backup data in the media cache area 140. Therefore, the control circuit 30 may invalidate the target data and validate the backup data written in the media cache area 140.

After S207, the control circuit 30 discards the backup data stored in the saving area, i.e., the copy of the target data (S208). By the processing of S207 and S208, the copy of the data in the overlapped range which is stored in the saving area is completely transferred from the saving area to the media cache area 140.

When the SMR verification succeeded (Yes in S206), the processing of S207 is skipped and the processing of S208 is executed.

Following S208, the control circuit 30 determines whether or not writing of all of the data requested to be written by the write request received in S201 is completed (S209).

When it is determined that writing of all of the data is completed (Yes in S209), a series of processing related to the write-and-verify processing is completed. When it is determined that data that is not yet written remains (No in S209), the control circuit 30 executes the processing of S202 again.

In addition, in the above description, in S204, after writing, CMR verification is executed for the data written in the band 120 by the writing. The CMR verification may not be necessarily performed.

In addition, an example where the CMR verification failed has not been described above in detail. A processing when the CMR verification failed may be set to any processing. For example, when the CMR verification failed, the control circuit 30 may write the same data to the same position.

When the CMR verification is executed and succeeded, the control circuit 30 may correctly read the data when copying the data to the saving area later.

In addition, the write-and-verify processing may not be necessarily executed for each write request. For example, the control circuit 30 may execute the write-and-verify processing when the temperature of the magnetic disk device 1 is higher than a preset upper limit value or when the temperature of the magnetic disk device 1 is lower than a preset lower limit value. Alternatively, a write-and-verify request may be defined as one of write requests, and the control circuit 30 may execute the write-and-verify processing when receiving the write-and-verify request from the host 40.

As described above, conditions may be set with regard to the execution of the write-and-verify processing. When the condition for executing the write-and-verify processing is not satisfied, the control circuit 30 may write data requested by the write request to the band 120 of the write destination, and thereafter may not execute the CMR verification or the SMR verification.

As described above, according to the embodiment, before writing data (referred to herein as first data) to a track (referred to herein as first track), the control circuit 30 specifies a range in which a track pitch is reduced by writing to the first track, i.e., an overlapped range of a track which is adjacent to the first track (referred to herein as second track) and to which data is already written (e.g., S202 of FIG. 9). Then, the control circuit 30 copies the data written in the specified range (referred to herein as second data) to a saving area (e.g., S203 of FIG. 9). After executing the copying, the control circuit 30 executes writing of the first data (e.g., S204 of FIG. 9). After writing the first data, the control circuit 30 executes the SMR verification for the second data in the second track (e.g., S205 of FIG. 9).

Therefore, it is possible to reduce the amount of data stored in the saving area as compared with the comparative example.

In addition, the magnetic disk device 1 of the embodiment may adopt a method called "host managed" as a method of controlling writing. Host managed method is a method in which the host 40 instructs the magnetic disk device 1 to write data in a write pattern suitable for SMR.

More specifically, according to the host managed method, the magnetic disk device 1 (e.g., the control circuit 30) manages a write pointer for each band 120. Writing of data is executed in the order of logical addresses in each band 120, and the write pointer indicates a logical address at a position subsequent to the end of the written data. Next writing is executed for a position indicated by the write pointer.

The host 40 may transmit a request to the magnetic disk device 1. The magnetic disk device 1 may return a write pointer in response to the request. The host 40 may transmit a write request to write data to a position indicated by the write pointer received from the magnetic disk device 1.

Figure 10:
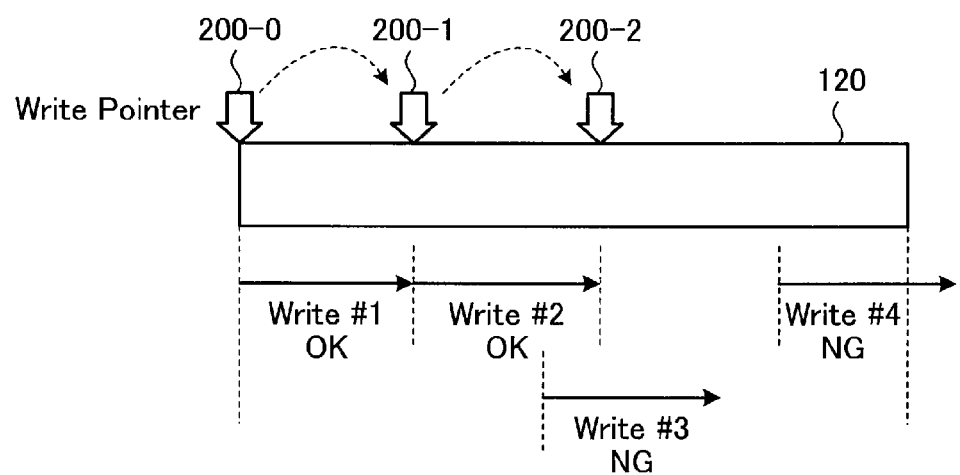
FIG. 10 is a diagram illustrating an outline of an operation of the magnetic disk device conforming to a host managed method, according to the embodiment.

FIG. 10 is a diagram illustrating an outline of an operation of the magnetic disk device 1 conforming to a host managed method according to the embodiment. Here, a write operation to one band 120 will be described.

As illustrated in FIG. 10, in a state where no data is written to the band 120, a write pointer indicates the head of a logical address assigned to the band 120 (write pointer 200_0). Then, when receiving a request for write access (write #1) to write data to a position indicated by the write pointer 200_0 from the host 40, the control circuit 30 executes write #1 and advances the write pointer only by the amount that is written by the write #1 (write pointer 200_1).

In addition, when receiving a request for write access (write #2) to write data to a position indicated by the write pointer 200_1 from the host 40, the control circuit 30 executes requested write #2 and advances the write pointer only by the amount that is written by the write #2 (write pointer 200_2).

After the write #2 is executed, when write access (write #3) to write data to a position before a position indicated by the write pointer 200_2 is requested, the control circuit 30 does not execute write #3. That is, the write #3 gets an error.

In addition, after execution of the write #2, when write access (write #4) to write data from the position indicated by the write pointer 200_2 to a position at which a gap is opened is requested, the control circuit 30 does not execute write #4. That is, the write #4 gets an error.

Contrary to the host managed method, a method called "drive managed" is known. According to the drive managed method, the magnetic disk device 1 (e.g., the control circuit 30) may accumulate data received from the host 40 in the media cache area 140 instead of the band 120 of the write destination. After all data to be written to the band 120 of the write destination is accumulated in the media cache area 140, the magnetic disk device 1 may write the data from the media cache area 140 to the band 120 of the write destination.

According to the drive managed method, since the magnetic disk device 1 may control the timing of writing to each band 120, writing is possible to the SMR area 110 for each band 120. Thus, it is possible to reduce the number of bands 120 to the middle of which data is written.

On the other hand, according to the host managed method, writing to each band 120 is executed in response to a write request from the host 40. That is, the host 40 may freely control the timing of writing to each band 120. Thus, depending on the behavior of the host 40, there is a possibility that there is a plurality of bands 120 to the middle of which data is written.

Data for which the write-and-verify processing is not yet completed is present in the band 120 to the middle of which data is written. Thus, when the comparative example is applied to the magnetic disk device conforming to the host managed method, all data for which the SMR verification is not completed with regard to each of the bands 120 to the middle of which data is written is stored in the saving area. Therefore, there is a possibility that the amount of data stored in the saving area is considerably increased.

On the other hand, according to the embodiment, copying of data from the band 120 to the saving area is executed when processing a write request targeting the band 120. Even when there is the band 120 to the middle of which data is written, a copy of the data with regard to the band 120 is not stored in the saving area as long as the band 120 is not the target of the write request. Thus, when the embodiment is applied to the magnetic disk device conforming to the host managed method, it is possible to remarkably reduce the amount of data stored in the saving area as compared with the comparative example.

In addition, the embodiment may also be applied to a device other than the magnetic disk device 1 conforming to the host managed method. For example, the embodiment may also be applied to the magnetic disk device 1 conforming to the drive managed method.

According to the embodiment, the disk medium 11 further includes the media cache area 140 which is a redundant area. When the control circuit 30 failed in the SMR verification, the control circuit 30 transfers a copy of data (referred to herein as backup data) in the overlapped range from the saving area to the media cache area 140. The backup data written in the media cache area 140 by the transfer is used as an alternative to the data in the overlapped range.

Thus, even if the SMR verification may not verify that the data is normally readable, data that is determined to be normally unreadable is prevented from being lost from the magnetic disk device 1.

In addition, the size of the overlapped range is equal to or smaller than the size of the saving area.

Therefore, the write-and-verify processing may be executed for each size of the saving area.

In addition, the control circuit 30 may use the buffer memory 29, which is a volatile memory, as a saving area.

The buffer memory 29 may operate faster than, for example, the FROM 28 or the disk medium 11. By using the buffer memory 29 as a saving area, the speed at which the write-and-verify processing is executed is increased.

In addition, in the above description, the buffer memory 29 has been described as an example of a volatile memory that is used as a saving area. Instead of the buffer memory 29, the RAM 27 which is a volatile memory may be used as a saving area.

In addition, the control circuit 30 has a PLP function of protecting the content of the saving area in the buffer memory 29 from being lost at the occurrence of shutdown.

Therefore, when the buffer memory 29 is used as a saving area, the content of the saving area is prevented from being lost from the magnetic disk device 1. That is, even when shutdown occurs, the data received from the host 40 is prevented from being lost from the magnetic disk device 1 before the write-and-verify processing is completed.

In addition, the control circuit 30 may use the FROM 28, which is a nonvolatile memory, as a saving area.

This prevents the data received from the host 40 from being lost from the magnetic disk device 1 before the write-and-verify processing is completed, even when shutdown occurs.

In addition, the control circuit 30 may use the media cache area 140 as a saving area.

The media cache area 140 is a nonvolatile storage area. Thus, even when shutdown occurs, the data received from the host 40 is prevented from being lost from the magnetic disk device 1 before the write-and-verify processing is completed.

In addition, the control circuit 30 determines whether or not the non-interference area 190 (more specifically, the non-interference area 190 having a sufficiently large size) in which magnetic influence on data that is already written given by writing in an unused area is equal to or less than a predetermined level) exists in the band 120. Then, when it is determined that there is the non-interference area 190, the control circuit 30 uses the non-interference area 190 as a saving area.

Therefore, since a position closer to the write position than the media cache area 140 may be used as a saving area, the time required for seeking is shortened. In other words, it is possible to shorten the time required for processing a write request.

For example, when the magnetic disk device 1 operates in a host managed manner, in response to a read request in which a position after the position indicated by the write pointer is a read destination in each band 120, the magnetic disk device 1 returns an error or predetermined pattern data. Since the non-interference area 190 is set to a position after the position indicated by the write pointer, even if the host 40 issued a request for reading using the non-interference area 190 as a read destination, the magnetic disk device 1 does not transmit the data stored in the non-interference area 190 to the host 40. That is, the content of the saving area provided in the non-interference area 190 is concealed from the host 40.

In addition, when it is determined that there is no non-interference area 190 in the band 120, the control circuit 30 uses the media cache area 140 as a saving area.

In addition, according to the embodiment, the control circuit 30 writes data to a track, and then executes CMR verification for the data written to the track.

Thus, the control circuit 30 may read the correct data when copying the data to the saving area.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a magnetic disk including a first area where writing is performed in a manner such that a newly written track partially overlaps a previously written adjacent track; and
a control circuit configured to specify a range of a second track, which is to be overlapped as a result of writing first data to a first track, write second data written in the specified range of the second track to a saving area prior to writing the first data to the first track, write the first data to the first track, and verify the second data in the second track after writing the first data to the first track.

2. The magnetic disk device according to claim 1, wherein
the magnetic disk further includes a second area different from the first area, and
the control circuit transfers the second data written to the saving area to the second area when the verification of the second data fails.

3. The magnetic disk device according to claim 1, wherein the first data has a size equal to or less than a size of the saving area.

4. The magnetic disk device according to claim 1, further comprising a volatile memory,
wherein the control circuit uses the volatile memory as the saving area.

5. The magnetic disk device according to claim 4, wherein the control circuit is configured to protect contents of the saving area from being lost at occurrence of shutdown.

6. The magnetic disk device according to claim 1, further comprising a nonvolatile memory,
wherein the control circuit uses the nonvolatile memory as the saving area.

7. The magnetic disk device according to claim 1, wherein
the magnetic disk further includes a second area which is different from the first area, and
the control circuit uses the second area as the saving area.

8. The magnetic disk device according to claim 1, wherein the control circuit determines whether or not there is an unused region of the first area that is spaced apart far enough from previously written tracks of the first area so that magnetic influence on the previously written tracks from writing to the unused region is less than a predetermined level, and uses the unused region of the first area as the saving area when it is determined that the unused region is present.

9. The magnetic disk device according to claim 8, wherein
the magnetic disk further includes a second area different from the first area, and
the control circuit uses the second area as the saving area when it is determined that the unused region is not present.

10. The magnetic disk device according to claim 1, wherein the control circuit is configured to verify the first data in the first track after writing the first data to the first track.

11. A control method of a magnetic disk device, the method comprising:
writing to a first area of a magnetic disk of the magnetic disk device in a manner such that a newly written track partially overlaps a previously written adjacent track, wherein writing first data to a first track that partially overlaps a second track includes:
a first operation of specifying a range of the second track, which is to be overlapped as a result of writing the first data to the first track;
a second operation of writing second data written in the specified range of the second track to a saving area;
a third operation of writing the first data in the first track after the second operation; and
a fourth operation of verifying the second data in the second track after the third operation.

12. The control method according to claim 11, wherein
the magnetic disk further includes a second area different from the first area, and
the control method further includes transferring the second data written to the saving area to the second area when the verification of the second data fails.

13. The control method according to claim 11, wherein the first data has a size equal to or less than a size of the saving area.

14. The control method according to claim 11, wherein
the magnetic disk device further comprises a volatile memory, and
the volatile memory is used as the saving area.

15. The control method according to claim 14, further comprising:
protecting contents of the saving area from being lost at occurrence of shutdown.

16. The control method according to claim 11, wherein
the magnetic disk device further comprises a nonvolatile memory, and
the nonvolatile memory is used as the saving area.

17. The control method according to claim 11, wherein
the magnetic disk further includes a second area which is different from the first area, and
the second area is used as the saving area.

18. The control method according to claim 11, further comprising:
determining whether or not there is an unused region of the first area that is spaced apart far enough from previously written tracks of the first area so that magnetic influence on the previously written tracks from writing to the unused region is less than a predetermined level,
wherein the unused region of the first area is used as the saving area when it is determined that the unused region is present.

19. The control method according to claim 18, wherein
the magnetic disk further includes a second area different from the first area, and
the second area is used as the saving area when it is determined that the unused region is not present.

20. The control method according to claim 11, wherein the third operation of writing the first data in the first track after the second operation further includes verifying the first data written in the first track.

* * * * *